US010104109B2

(12) United States Patent
Singla et al.

(10) Patent No.: US 10,104,109 B2
(45) Date of Patent: Oct. 16, 2018

(54) THREAT SCORES FOR A HIERARCHY OF ENTITIES

(71) Applicant: HEWLETT PACKARD DEVELOPMENT COMPANY, L.P., Houston, TX (US)

(72) Inventors: Anurag Singla, Sunnyvale, CA (US); Monica Jain, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/914,122

(22) PCT Filed: Sep. 30, 2013

(86) PCT No.: PCT/US2013/062624
§ 371 (c)(1),
(2) Date: Feb. 24, 2016

(87) PCT Pub. No.: WO2015/047394
PCT Pub. Date: Apr. 2, 2015

(65) Prior Publication Data
US 2016/0212165 A1    Jul. 21, 2016

(51) Int. Cl.
*H04L 29/06* (2006.01)
*G06F 21/57* (2013.01)
*G06F 3/0484* (2013.01)

(52) U.S. Cl.
CPC ...... *H04L 63/1433* (2013.01); *G06F 3/04847* (2013.01); *G06F 21/577* (2013.01)

(58) Field of Classification Search
CPC ..... H04L 63/14; H04L 63/20; G06F 3/04847; G06F 21/577
(Continued)

(56) References Cited

U.S. PATENT DOCUMENTS

| 7,278,163 | B2 * | 10/2007 | Banzhof | G06F 21/577 |
| | | | | 705/38 |
| 7,890,627 | B1 * | 2/2011 | Thomas | G06Q 10/107 |
| | | | | 709/206 |

(Continued)

FOREIGN PATENT DOCUMENTS

| CN | 101271498 | 9/2008 |
| CN | 102340485 | 2/2012 |

(Continued)

OTHER PUBLICATIONS

International Search Report & Written Opinion received in PCT Application No. PCT/US2013/062624, dated Jun. 20, 2014, 13 pages.

(Continued)

*Primary Examiner* — Taghi Arani
*Assistant Examiner* — Badri Champakesan

(57) ABSTRACT

A device for providing hierarchical threat intelligence includes a non-transitory machine-readable storage medium storing instructions that cause the device to receive, a plurality of calculated threat scores for a plurality of threat management devices, wherein the threat scores are respectively associated with context information, determine a first threat scores for a first entity based on a first subset of the calculated threat scores, determine a second threat score for a second entity based on a second subset of the calculated threat scores, receive update information of one of the calculated threat scores of the first subset from a listener of the threat management devices, and update the first threat score based on the update information.

10 Claims, 5 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 8,010,993 | B1* | 8/2011 | Bartholomay | H04L 63/10 |
| | | | | 726/1 |
| 8,015,604 | B1* | 9/2011 | Tidwell | H04L 41/046 |
| | | | | 709/224 |
| 8,201,257 | B1* | 6/2012 | Andres | G06F 21/568 |
| | | | | 726/23 |
| 8,898,784 | B1* | 11/2014 | Alexander | H04L 63/145 |
| | | | | 709/232 |
| 9,027,120 | B1* | 5/2015 | Tidwell | G06F 21/606 |
| | | | | 713/154 |
| 9,495,652 | B1* | 11/2016 | Cook | G06Q 10/00 |
| 9,674,207 | B2* | 6/2017 | Di Pietro | H04L 63/1416 |
| 2007/0011722 | A1* | 1/2007 | Hoffman | G08B 13/19608 |
| | | | | 726/3 |
| 2008/0091945 | A1* | 4/2008 | Princen | G06F 21/10 |
| | | | | 713/170 |
| 2008/0148376 | A1* | 6/2008 | Onozawa | G06F 21/41 |
| | | | | 726/8 |
| 2008/0288330 | A1* | 11/2008 | Hildebrand | G06Q 10/06 |
| | | | | 705/7.28 |
| 2009/0077214 | A1* | 3/2009 | Buster | G06Q 10/10 |
| | | | | 709/223 |
| 2009/0138521 | A1* | 5/2009 | Buster | G06F 17/30289 |
| 2009/0164783 | A1* | 6/2009 | Solis | H04L 9/3236 |
| | | | | 713/168 |
| 2010/0199352 | A1* | 8/2010 | Hill | G06F 21/577 |
| | | | | 726/25 |
| 2011/0126084 | A1* | 5/2011 | Serret-Avila | G06F 21/64 |
| | | | | 714/807 |
| 2011/0162070 | A1* | 6/2011 | Krasser | G06F 21/564 |
| | | | | 726/23 |
| 2011/0178942 | A1* | 7/2011 | Watters | G06Q 10/06 |
| | | | | 705/325 |
| 2011/0225650 | A1* | 9/2011 | Margolies | G06F 21/554 |
| | | | | 726/22 |
| 2011/0288692 | A1* | 11/2011 | Scott | G06F 21/55 |
| | | | | 700/297 |
| 2012/0023576 | A1* | 1/2012 | Sorensen | G06F 21/577 |
| | | | | 726/22 |
| 2012/0096552 | A1* | 4/2012 | Paek | G06F 21/552 |
| | | | | 726/23 |
| 2012/0253891 | A1* | 10/2012 | Hayes | G06Q 10/06 |
| | | | | 705/7.39 |
| 2012/0268269 | A1* | 10/2012 | Doyle | G08B 21/0202 |
| | | | | 340/539.13 |
| 2012/0311562 | A1 | 12/2012 | Wang et al. | |
| 2013/0018699 | A1* | 1/2013 | Stibel | G06Q 30/0201 |
| | | | | 705/7.29 |
| 2013/0055385 | A1* | 2/2013 | Antony | G06F 21/552 |
| | | | | 726/22 |
| 2013/0060825 | A1* | 3/2013 | Farcasiu | G06F 17/30557 |
| | | | | 707/812 |
| 2013/0074143 | A1* | 3/2013 | Bu | H04L 63/1416 |
| | | | | 726/1 |
| 2013/0097662 | A1* | 4/2013 | Pearcy | G06F 21/577 |
| | | | | 726/1 |
| 2014/0007238 | A1* | 1/2014 | Magee | G06F 21/577 |
| | | | | 726/24 |
| 2014/0114962 | A1* | 4/2014 | Rosenburg | G06Q 10/063 |
| | | | | 707/723 |
| 2014/0237545 | A1* | 8/2014 | Mylavarapu | H04L 63/1433 |
| | | | | 726/3 |
| 2014/0278733 | A1* | 9/2014 | Sabharwal | G06Q 10/0635 |
| | | | | 705/7.28 |
| 2015/0207809 | A1* | 7/2015 | MacAulay | G06F 21/552 |
| | | | | 726/22 |
| 2015/0207813 | A1* | 7/2015 | Reybok | G06F 21/552 |
| | | | | 726/22 |
| 2016/0205143 | A1* | 7/2016 | Bryson | H04L 63/205 |
| | | | | 726/1 |

FOREIGN PATENT DOCUMENTS

| | | |
|---|---|---|
| CN | 102932323 | 2/2013 |
| WO | WO-2012107557 A1 | 8/2012 |

OTHER PUBLICATIONS

Stoneburner, G. et al., "Risk Management Guide for Information Technology Systems," (Research Paper), Nist special publication 800.30, Jul. 2002, 56 pages.

Extended European Search Report dated Mar. 7, 2017 for EP Application No. 13894459.0 (8 pages).

Chen, Xiu-Zhen et al., Quantitative Hierarchical Threat Evalutation Model for Network Security, Journal of Software, Apr. 2006, 17(4): 885-897.

* cited by examiner

THREAT SCORES FOR A HIERARCHY OF ENTITIES

BACKGROUND

Security Information and Event Management (SIEM) technology provides real-time analysis of security alerts generated by network hardware and applications. SIEM technology can detect possible threats to a computing network. These possible threats can be determined from an analysis of security events. Dashboards can be used to present information about possible threats.

BRIEF DESCRIPTION OF THE DRAWINGS

The following detailed description references the drawings, wherein.

DETAILED DESCRIPTION

Figure 1:
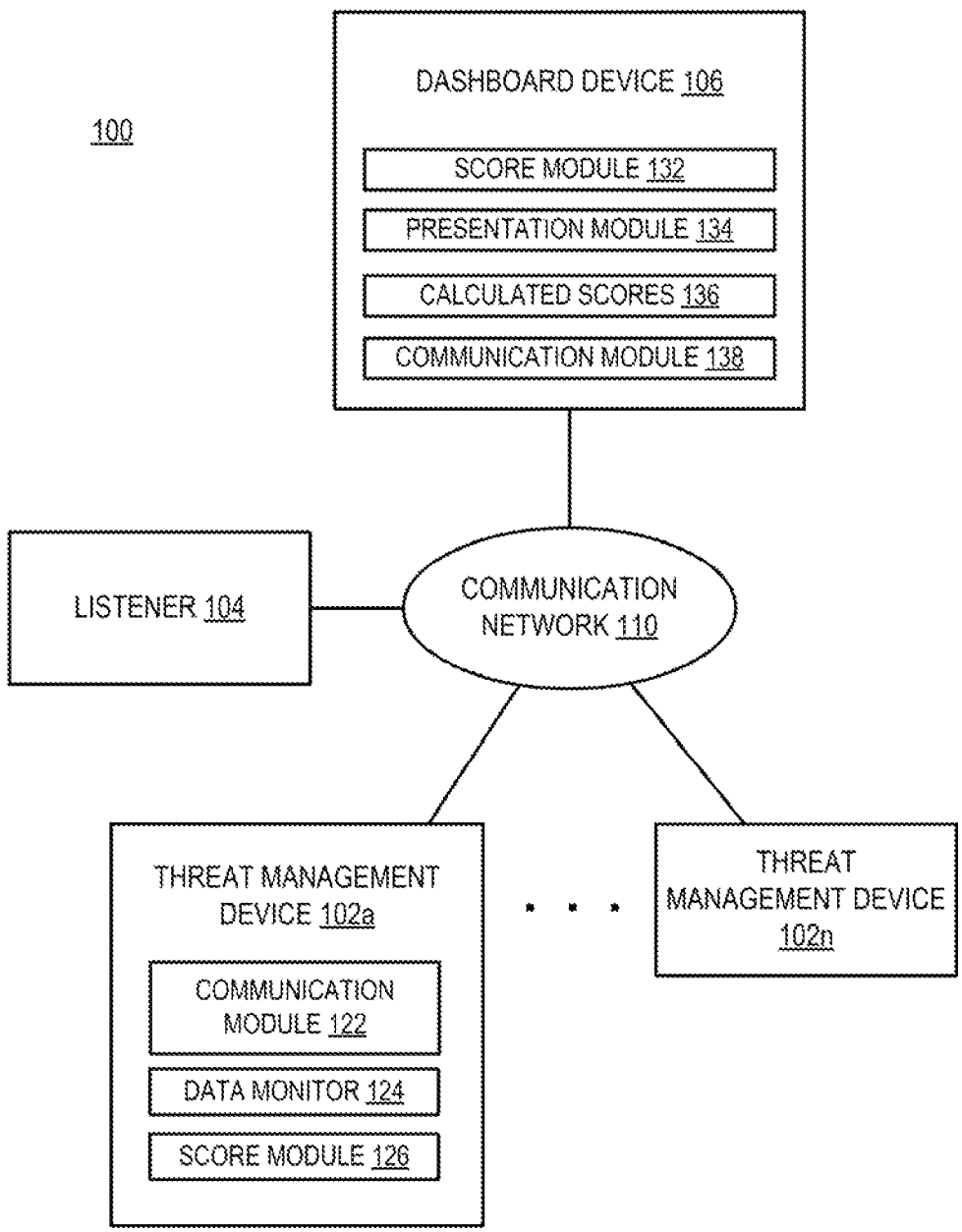
FIG. 1 is a block diagram of a system to determine threat scores, according to one example.

Security information/event management (SIM or SIEM) systems are generally concerned with collecting data from networks and networked devices that reflect network activity and/or operation of the devices and analyzing the data to enhance security. For example, data can be analyzed to identify an attack on the network or a networked device and determine which user or machine is responsible. If the attack is ongoing, a countermeasure can be performed to thwart the attack or mitigate the damage caused by the attack. The data that can be collected can originate in a message (e.g., an event, alert, alarm, etc.) or an entry in a log file, which is generated by a networked device. Example networked devices include firewalls, intrusion detection systems, servers, etc. In one example, each message or log file entry ("event") can be stored for future use. Stored events can be organized in a variety of ways.

There are numerous internet protocol (IP) address based devices on the Internet and/or other networks. Many of these devices may have malicious code executing. Further, employees or other individuals with physical access to a network may pose a security threat. Traffic from any of the potentially malicious devices to an enterprise should be scrutinized for any malicious behavior. Also, the kind of attack pattern from these devices and the vulnerabilities that these devices can exploit can vary over a large range. SIEM technology can identify a large range of threats such as risks and/or exploits. However, threats to the systems can be challenging to present to a security analyst or executive.

Accordingly, various embodiments herein describe hierarchical threat entities for use with a SIEM. The threat entity can be a standalone entity that computes a threat score based on executing queries on security event and model information using the SIEM database and/or real-time components (e.g., data monitors). The threat entity can be associated with one or more SIEM entities (e.g., actors, assets, groups, users, zones, categories, etc.). This information can be presented to a security analyst or executive, who can quickly understand the security threat risk of the Information Technology (IT) infrastructure, as well as drill down into the detailed threat composition. Threat history can be preserved and can allow the user to observe threat trends at a top level as well as at sub-levels. Moreover, automated actions can be taken based on the threat scores and/or changes to the threat scores. For example, if the threat score is on a scale of 0-100, a threat score of greater than 80 may lead to an alert, but a threat score of greater than 95 may lead to disablement of a threat entity (e.g., a user account). Moreover, the threat scores can be correlated to security events to trigger additional alerts or actions. For example, if the threat score is at 50, an automated alert or action may not be taken, however, when correlated with an incoming security event, an alert or other action can be taken.

The threat score can be based on various approaches. A threat can be considered a possible danger that might exploit a vulnerability to breach security, which may cause possible harm. A threat can be intentional, accidental (e.g., a due to a malfunction or act of God), or otherwise a circumstance, capability, action, or event. Examples of threats can include physical damage, natural events, loss of essential services (e.g., power), technical failures, compromise of information, compromise of functions, etc.

As noted, threats can be based on various circumstances. Approach for finding malicious activity include via signature matching, pattern discovery and matching, etc. Pattern discovery is a data mining based preemptive approach to solve many challenges faced by a security information and event management (SIEM) system. As such, the system can detect system anomalies by matching the known signatures, and/or by correlating security information and discovering the unknown patterns of traces in the system.

In certain examples, security information/event management for networks may include collecting data from networks and network devices that reflects network activity and/or operation of the devices and analyzing the data to enhance security. Examples of network devices may include firewalls, intrusion detection systems, servers, workstations, personal computers, etc. The data can be analyzed to detect patterns, which may be indicative of an attack or anomaly on the network or a network device. The detected patterns may be used, for example, to locate those patterns in the data. For example, the patterns may be indicative of activities of a worm or another type of computer virus trying to gain access to a computer in the network and install malicious software.

The data that is collected from networks and network devices is for events. An event may be any activity that can be monitored and analyzed. Data captured for an event is referred to as event data. The analysis of captured event data may be performed to determine if the event is associated with a threat or some other condition. Examples of activities associated with events may include logins, logouts, sending data over a network, sending emails, accessing applications, reading or writing data, port scanning, installing software, accessing rooms in a facility, etc. Event data may be collected from messages, log file entries, which is generated by a network device, or from other sources. Security systems may also generate event data, such as correlation events and audit events.

In some examples, anomaly detection can also be achieved by building a baseline of the normal patterns of the system, which has been learned off line. When any anomaly occurs, the system can detect the new patterns and alert system management. This alert, among other information, can be used to determine threat scores.

FIG. 1 is a block diagram of a system to determine threat scores, according to one example. The system 100 can include threat management devices 102a-102n that communicates with a listener 104, and other devices (not shown) via a communication network 110. In certain examples, the communication network 110 can also allow for a connection to a dashboard device 106. In some examples, the dashboard device 106 can be a threat management device. In certain examples, the threat management devices 102, listener 104, and/or dashboard device 106 are computing devices, such as servers, client computers, desktop computers, mobile computers, workstations, etc. In other embodiments, the devices can include special purpose machines. The devices can be implemented via a processing element, memory, and/or other components.

The threat management devices 102 can include a communication module 122 to communicate with other devices on the communication network 110 or other networks. The threat management device 102 may also include a data monitor 124. The data monitor 124 can be used to receive information about one or more devices or entities. In certain examples, a data monitor can correlate events into enhanced information. For example, data monitors can take information from security events and correlation and provide additional information, for example, hourly counts, event graphs (link analysis visualization), geographic event graphs, hierarchy maps, information about the last "N" events, the last state, a partial match of one or more rules, statistics, event and session reconciliation, system and system attribute monitors, asset category counts, etc.

The threat management devices 102 also include a score module 126 to determine scores for entities. As noted, a threat entity can be considered a standalone entity that computes a threat score based on executing queries on security event and model information using the SIEM database and/or real-time components. The entity itself may be based on context of the entity. For example, a threat entity can include a user, a zone of a building, an access controlled location, computing information (e.g., a protected database). The threat score can be a representation that the entity is in possible danger that might exploit a vulnerability to breach security, which may cause possible harm. When a threat score for an entity is updated, the information can be sent to the listener 104 via the communication module 122. As noted above, the system can maintain the threat scores in real-time based on real-time monitors.

The listener 104 can receive the information. In some examples, the information can include the threat score and an identifier of the threat entity. Further, the information may include an identifier of the threat management device 102 or other context information (e.g., information about other threat entities that the threat score may be based on). The listener 104 can provide updated information to the threat management devices 102 and/or dashboard devices 106. The listener can use various approaches to provide messages to the devices for information the devices are interested in. For example, a publish/subscribe messaging scheme can be used. In certain examples, a threat management device can subscribe to one or more threat entities via the listener 104. When scores for those threat entities are updated, to the listener 104, the listener 104 can send updated information to the subscribers. In some examples, a notice can be sent and the subscriber can retrieve the information from the listener or directly at the threat management device. Other approaches can be used to disseminate the information (e.g., request-reply, push-pull, etc.). With these approaches, threat management devices 102 can be provided calculated threat scores of threat entities that may be lower in their hierarchies. Using the hierarchies can also reduce the possibility of a race condition of one threat entity score being based on another threat entity based on the first threat entity.

In one example, a building may be broken down into zones. Each zone can be considered a threat entity and may include information from other threat entities (e.g., a secure door) lower in a hierarchy. A threat entity higher in the hierarchy, such as the building, can have a threat score that depends from the zones, and/or lower level threat entities. The higher level threat entities can subscribe to the lower level threat entities via the listener 104 to receive information about the lower level threat entities.

In certain examples, the threat management device 102 that receives the information from the listener 104 can be a dashboard device 106. The dashboard can receive calculated scores 136 from the communication module 138. Further, the communication module 138 can receive additional updates from the listener 104 that can update and/or change scores of one or more threat entities calculated at other threat management devices. The score module 132 can determine a threat score for an entity associated with a threat entity from one of the threat management devices 102 that updated its score to the listener 104. In one example, the entity is higher in the hierarchy from the threat entity that was updated. For example, the building threat entity may rely on one or more zone threat scores calculated at respectively associated threat management devices 102. Other threat management devices 102 may compute scores based on information received from the listener 104 using similar approaches as the dashboard device 106.

In some examples, the calculated threat score can be considered a first top level threat score. This can be presented via the presentation module 134 to a user. Moreover, a second top level threat score can be determined for a second entity based on a second subset of the calculated threat scores. In the building example, the top level threat score may be associated with a second building, a site including buildings, a country of sites, etc. Presentation of a first user interface element of the first top level threat score and a second user interface element of the second top level threat score can be presented. Additional top level scores can also be presented. In some examples, the top level score is a score that is based on at least one lower level score. When update information is received about one of the calculated threat scores of the subset from the listener, the first top level threat score can be updated based on the update information.

Figure 6:
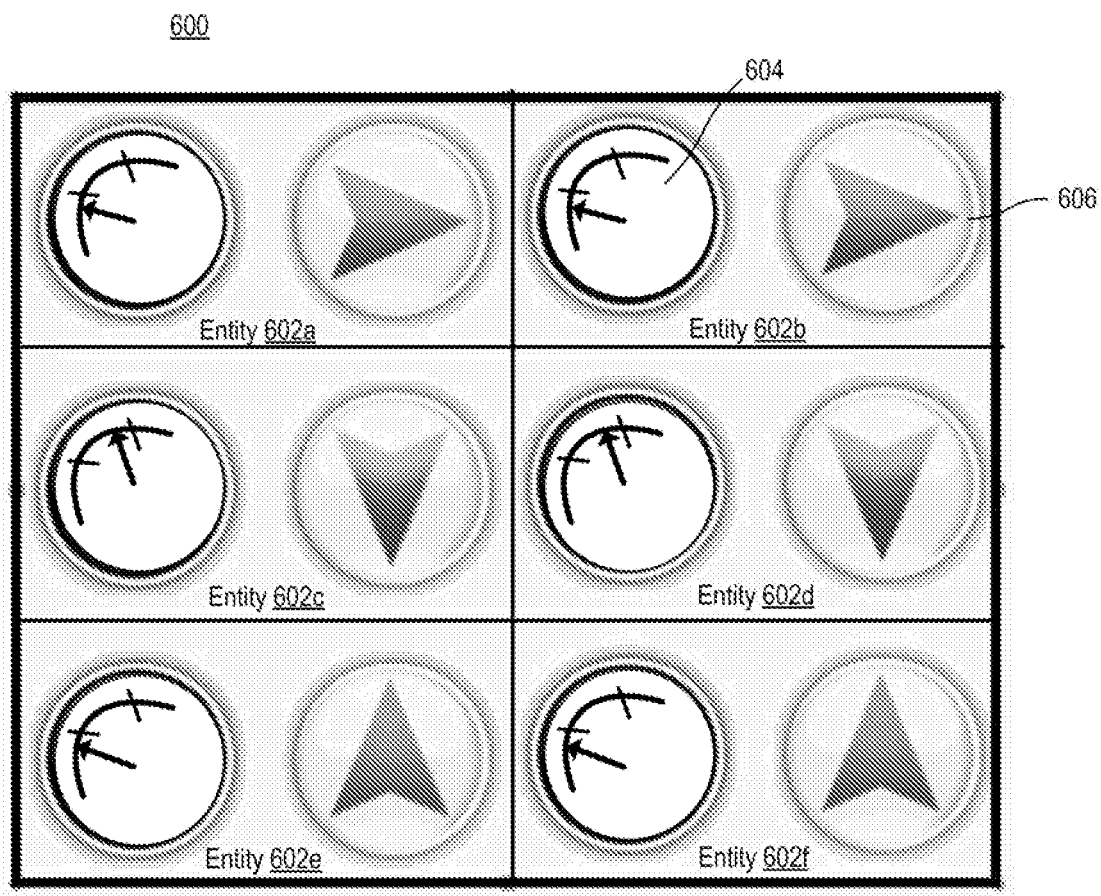
FIG. 6 is a block diagram of an example user interface for a dashboard to present threat scores, according to one example.

As such, the presentation module 134 can cause presentation of an updated first user interface element based on the update. The device can receive a selection input selecting the updated first user interface element. When the user interface element is selected, the presentation module 134 can cause presentation of the calculated threat score of the first subset in response. As such, the user can look further into the hierarchy of threat scores. Information about the context of the associated threat entities can also be presented. In some examples, the user is provided with options of security actions (e.g., shut down an entity associated with the threat score, restrict the entity, limit network access, etc.) to perform based on the threat score. Further detail into an example dashboard user interface is shown in FIG. 6.

Moreover, the threat management devices 102, such as the dashboard device 106, can perform other tasks based on the threat scores. For example, a threat management device 102 can receive information about an event. A security action can be generated based on the current threat score associated with one or more entities associated with the event information. The security action can further be different for the incoming event information based on the threat score. Examples of security actions include limiting access to one or more components of the entity, causing an alert to an administrator, disabling access to the one or more components, providing another type of response, providing the alert with one or more suggested response solutions, etc.

Moreover, in certain examples, correlation can be performed using the system 100. As such, threat scores can be used in other correlation components like queries, trends, rules and data monitors. For each threat score resource, each time the score changes, it can be saved in the DB with the timestamp. The user can be provided the ability to see the trend of threat score changes over a period of time (e.g., in the form of a graph or table). For example, the current threat score versus the threat score same time last month, multiple months, etc. Another source can be internal events generated for these threat scores. These internal events can also be used in rules. For example, to get an alert when something bad happens or when the threat level is at red (e.g., above a threshold level) or when there is a deviation from "normal" level of activity.

The communication network 110 can use wired communications, wireless communications, or combinations thereof. Further, the communication network 110 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 110 can be in the form of a direct network link between devices. Various communications structures and infrastructure can be utilized to implement the communication network(s).

By way of example, the devices 102, 104, 106 communicate with each other and other components with access to the communication network 110 via a communication protocol or multiple protocols. A protocol can be a set of rules that defines how nodes of the communication network 110 interact with other nodes. Further, communications between network nodes can be implemented by exchanging discrete packets of data or sending messages. Packets can include header information associated with a protocol (e.g., information on the location of the network node(s) to contact) as well as payload information.

A processor, such as a central processing unit (CPU) or a microprocessor suitable for retrieval and execution of instructions and/or electronic circuits can be configured to perform the functionality of any of the modules used in the respective devices described herein. In certain scenarios, instructions and/or other information, such as configuration files, the web application code, etc., can be included in memory. Input/output interfaces may additionally be provided by the respective devices. For example, input devices, such as a keyboard, a touch interface, a mouse, a microphone, etc. can be utilized to receive input from an environment surrounding the computing device. Further, an output device, such as a display, can be utilized to present or output information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

Each of the modules may include, for example, hardware devices including electronic circuitry for implementing the functionality described herein. In addition or as an alternative, each module may be implemented as a series of instructions encoded on a machine-readable storage medium of device and executable by at least one processor. It should be noted that, in some embodiments, some modules are implemented as hardware devices, while other modules are implemented as executable instructions.

Figure 2:
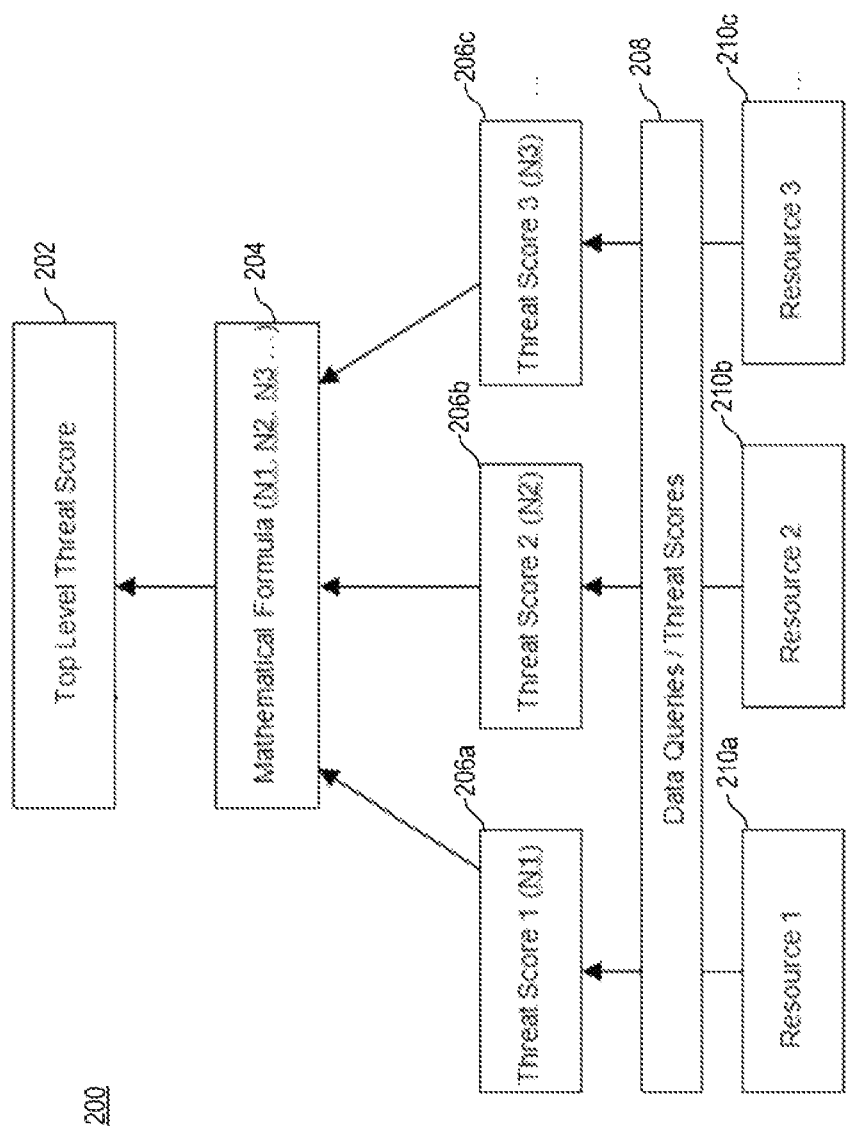
FIG. 2 is a block diagram of a system capable of determining threat scores based on threat scores of other entities, according to one example.

FIG. 2 is a block diagram of a system capable of determining threat scores based on threat scores of other entities, according to one example. A score module 126, 132 can be used to generate a mid-level or top level threat score 202. In some examples, a top level threat score 202 for one entity may be a mid-level threat score for an entity higher in the hierarchy.

The score modules can use a threat score builder that can allow a user to select data sources for various numbers that the user would like to use to calculate a final or mid-level threat score using a mathematical formula 204. The threat score builder can look like Table 1.

TABLE 1

| Threat Score Building | |
|---|---|
| Numbers | Data Source (a drop down list with Queries, Risk Scores) |
| N1 | |
| N2 | |
| N3 | |
| . . . | |
| Final Risk Score | Apply Formula Calculate |

In this scenario, N1 206a, N2 206b, N3 206c . . . Nn (not shown) are the numbers that the user can generate from various data sources (e.g., event resources, other threat scores, etc.). The data sources can include data queries or queries to threat scores 208. The data queries can be built on various resources 210a, 210b, 210c, 210n (not shown) like session lists, active lists, assets etc. in a way that it only returns one numeric field. Data sources can also include other sources like Active tables. Each data source can be validated such that it returns only a numeric number.

Once the user selects data sources for the various numbers, the user will be able to manipulate these numbers by applying a mathematical formula on these numbers to calculate a final score (e.g., a top-level score or mid-level score). In some examples, when the user clicks on Apply Formula in Table 1, it will bring another user interface called Formula builder.

The Formula builder will allow user to use some mathematical operators like (+, −, /, *, sqrt etc.) on the various numbers he selected to calculate his final threat score. For example, Threat Score=sqrt ((N1*0.08)+(N2*0.04)+4*N4). In other examples, the threat score may be prioritized based on importance of a particular context (e.g., site, data, etc.).

Further, the threat score may be the minimum or maximum of another one of the threat scores or may use such a function in the calculation.

To roll up the score changes, each threat score can register itself to a score change listener component. Each time a threat score changes, it can notify the score change listener component. In some examples, the score change listener component will be responsible for notifying other threat scores using the changed threat score to re-calculate their score based on the new value. This way each threat score change will be picked up by other threat scores using it, and in the end, all the score changes will get propagated all the way to the top. Also, using a hierarchy limits the risk of a race condition for the updates.

In some examples, a scheduled task can be used to calculate all the threat scores at a time interval. The user will be allowed to customize the schedule for calculating the threat scores. Additionally, the user can also be allowed to re-calculate the risk scores manually at any time.

Internal events can be sent whenever a threat score changes. These events can have the information about the previous risk score, new risk score and about the direction of the risk score (for example, it went up, went down etc.) in custom fields. These internal events can be used for other correlation components like Rules, Reports, DataMonitors, Trends, and Active Lists etc.

Figure 3:
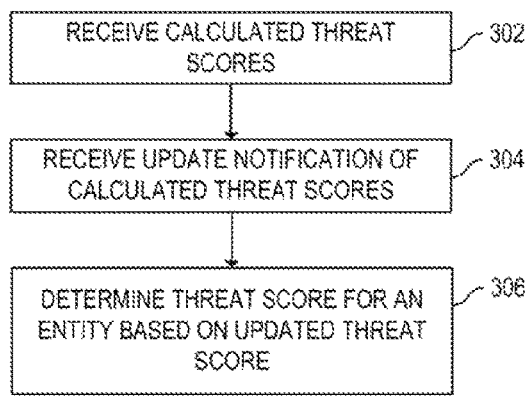
FIG. 3 is a flowchart of a method for determining a threat score for an entity based on another threat score, according to one example.

FIG. 3 is a flowchart of a method for determining a threat score for an entity based on another threat score, according to one example. Although execution of method 300 is described below with reference to system 100, other suitable components for execution of method 300 can be utilized (e.g., computing device 500). Additionally, the components for executing the method 300 may be spread among multiple devices. Method 300 may be implemented in the form of executable instructions stored on a machine-readable storage medium, such as storage medium 520, and/or in the form of electronic circuitry.

At 302, a threat management device 102, such as the dashboard device 106, can receive calculated threat scores for multiple threat management devices. These calculated threat scores can be related to threat entities. More than one threat entity may be represented on a threat management device. In some examples, the threat entity can represent a location or an organization system. In other examples, threat entities can also represent actors, assets, groups, users, zones (e.g., a zone of a building), an access controlled location, categories, computing information (e.g., database information that is protected and may be attacked), etc. Moreover, the respective threat entities can provide context information. For example, the threat entities can include the zone or location as contextual information, which can also be hierarchical.

At 304, the device can receive an update notification of one or more of the calculated threat scores from a listener. The listener can receive updates to the calculated threat scores of other management devices. Moreover, the listener can be notified when one of the calculated threat scores changes. When the listener gets this update, the update notification is sent to each of the devices, including the device, that is subscribed to notifications for updates to the score. Subscription information can be used to track which devices and/or programs running on the devices are interested in the scores. The notifications can be based on an interrupt system and/or periodic. At 306, the device can determine a threat score for an entity based on the updated calculated threat score and another one of the threat scores. Further, in some examples, other resources can be used to generate the threat score. Additional examples of the generation of the threat scores can be found in the description of FIG. 2.

In some examples, presentation can be caused of the threat score. One or more threat scores of different entities can be presented on a dashboard like the one in FIG. 6. An interactive user interface element can be used to present the threat score. When the user interface element is selected, a drill down of the threat score can be presented. If available (e.g., if there are additional lower level data points in the hierarchy), further drill downs can be performed from this level as well.

Figure 4:
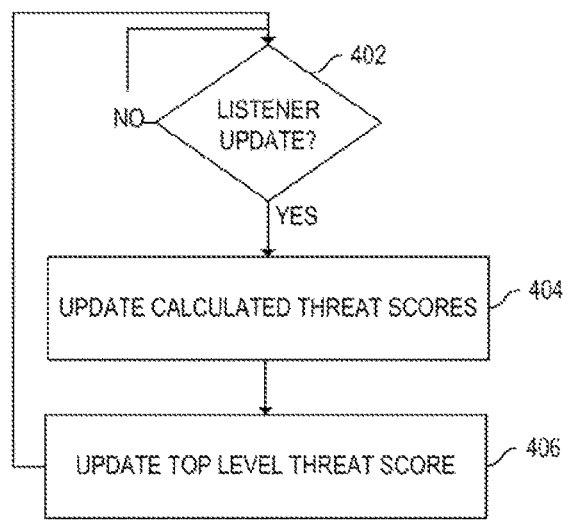
FIG. 4 is a flowchart of a method for updating a threat score based on updated calculated threat scores, according to one example.

FIG. 4 is a flowchart of a method for updating a threat score based on updated calculated threat scores, according to one example. Although execution of method 400 is described below with reference to system 100, other suitable components for execution of method 400 can be utilized (e.g., computing device 500). Additionally, the components for executing the method 400 may be spread among multiple devices. Method 400 may be implemented in the form of executable instructions stored on a machine-readable storage medium, such as storage medium 520, and/or in the form of electronic circuitry.

The device can wait for or otherwise receive an update from a listener for calculated threat scores that the device subscribes to (402). If there is an update to a calculated threat score, the device can update the threat score in its database 404. This can be automatic based on the receiving of the information from the listener. Additionally, trend information can be determined from the change. For example, trend information may be based on the previous score and the new score and/or other previous scores. A formula for a trend or whether it is going up, down, or about the same can be determined. Moreover, at 406, the top level threat score can be updated based on the updated calculated threat score. Presentation can be made of the updated top level threat score. Moreover, in some examples, trend information of the top level threat score can be determined based on one or more previous top level threat scores and the updated information. The trend information can also be presented as further shown in FIG. 6. As such, the presentation of the trend information can include a direction of a trend based on updates of the top level threat score.

Figure 5:
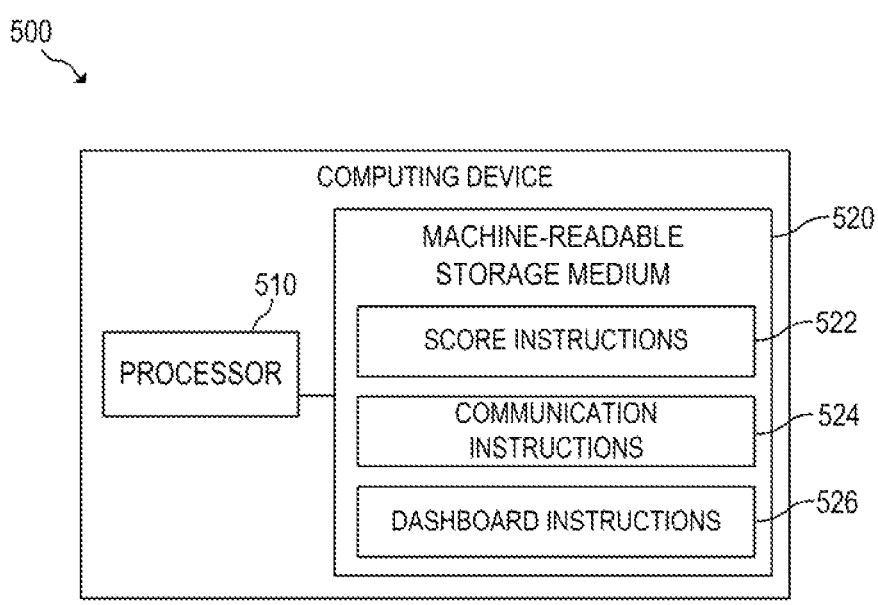
FIG. 5 is a block diagram of a computing device capable of updating and presenting a threat score for an entity, according to one example.

FIG. 5 is a block diagram of a computing device capable of updating and presenting a threat score for an entity, according to one example. The computing device 500 includes, for example, a processor 510, and a machine-readable storage medium 520 including instructions 522, 524, 526 for updating and presenting a threat score for an entity in a hierarchical threat intelligence environment. Computing device 500 may be, for example, a notebook computer, a slate computing device, a portable reading device, a wireless email device, a mobile phone, a workstation, a server, a desktop computer, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement methods 300 and 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for keeping track of threat scores.

Communication instructions 524 can be used to receive, a calculated threat scores for threat management devices. The threat scores can be respectively associated with context information. As noted above, the context information can relate to a location, data protected, zones, etc.

The score instructions 522 can be executed to determine a first threat score for a first entity based on a first subset of the calculated threat scores. A second threat score for a second entity can be determined based on a second subset of the calculated threat scores. The determined first and second threat scores can also be based on other information, for example, other resources as shown in FIG. 2.

Update information can be received for one of the calculated threat scores of the first subset from a listener of the threat management devices. The first threat score can be updated based on the update information. Presentation of a first user interface element of the first threat score and a second user interface element of the second threat score can be caused. In some examples, the presentation can be in the form of a dashboard onto a display device or projection (e.g., by sending a signal to the device).

In one example, selection input is received selecting the first user interface element. Presentation of at least two of the calculated threat scores of the first subset can be caused based on the selection. Further, presentation of a context respectively associated with the at least two calculated threat scores of the first subset can be caused.

Trend information about the first threat score can be determined based on the non-updated first threat score and the update information. A dashboard can be used to present the trend information as further discussed in FIG. 6.

FIG. 6 is a block diagram of an example user interface for a dashboard to present threat scores, according to one example. An advantage of calculating the top level threat scores is to display them on a single dashboard 600 to give a complete high-level picture to the executives at a glance. FIG. 6 shows one example of the dashboard.

In certain examples, the dashboard can show threat levels of entities 602a-602f. In certain examples, the threat levels could be shown by different colors like green (healthy), yellow (warning) and red (alarming). The user can be able to customize the threat levels by selecting a range of score for each threat level. The arrows next to the speedometer 604 can show the trend or the direction 606 of the threat score whether it went up or down or stayed the same. Additionally or alternatively, two arrows can be placed on the speedometer 604, one showing the current threat score and the other one is grayed out showing the previous threat score. Other ways can be used to show a threat score other than the speedometer, for example, presentation of the threat score can be done using a number, a bar, etc. The presentation can be of a user interface element.

The user will be able to drill down the dashboard to reach the scoring mechanism for each threat score. As such, if entity 602a is selected, the threat scores of the entities that are used for the top-level score can be displayed. The display can be presented in a similar manner. As such, the user can quickly determine if there is a single place where a change in the status may be coming from. Additional drill downs can be performed as well if there are threat scores or other information available. In one example, the user interface element presented can be interactive. When interacted with, the drilled down dashboard can include calculated scores of calculated threat scores/resources used in generating the threat score selected (e.g., speedometer 604). In some examples, the drill down can continue until a resource or data monitor is presented. In some examples, the resource can be a value representative of something (e.g., login, length of time a door is open, etc.) associated with a particular entity. The description of the value can be presented with the resource information.

What is claimed is:

1. A non-transitory machine-readable storage medium storing instructions that when executed cause a device to:
   receive calculated threat scores from threat management devices that are part of a network system comprising a network, wherein the threat scores are for respective threat entities that are part of the network system and are respectively associated with context information, the context information for a first threat score of the threat scores including information about a first subset of threat entities on which the first threat score is based, the first threat score calculated for a first threat entity that is at a higher level in a hierarchy of threat entities than the first subset of threat entities;
   determine a second threat score for a second threat entity based on threat scores calculated for a second subset of threat entities including the first threat entity, and the second threat entity being at a higher level in the hierarchy of threat entities than the second subset of threat entities;
   subscribe with a listener of the threat management devices for updated scores calculated for the second subset of threat entities;
   receive, in response to the subscribing, update information of the first threat score calculated for the first threat entity from the listener;
   update the second threat score based on the update information;
   perform a countermeasure that addresses a threat in the network system in response to the updated second threat score, the countermeasure comprising disabling the second threat entity;
   receive selection input selecting a first user interface element representing the first threat score;
   determine trend information about the first threat score based on a non-updated version of the first threat score and the update information; and
   cause presentation of at least two of the calculated threat scores for the first subset of threat entities, a context respectively associated with the at least two calculated threat scores of the first subset of threat entities, and the trend information.

2. A system for providing a hierarchical threat intelligence, comprising:
   a plurality of threat management devices to calculate threat scores for respective entities based on security event information, the calculated threat scores including a first threat score for a first entity calculated based on threat scores of a first subset of entities, the first entity being at a higher level in a hierarchy of entities than the entities in the first subset of entities, wherein each of the plurality of threat management devices includes a memory and a processor coupled to the memory;

a listener to:
  receive the calculated threat scores from the threat management devices,
  provide the calculated threat scores to a plurality of other threat management devices;

at least one of the other threat management devices to:
  determine a second threat score for a second entity based on the threat scores calculated for a second subset of entities, the second subset of entities including the first entity, and the second entity being at a higher level in the hierarchy of entities than the entities of the second subset of entities,
  subscribe with the listener for updated scores calculated for the threat entities of the second subset of threat entities,
  receive, from the listener in response to the subscribing, update information of the first threat score calculated for the first entity,
  update the second threat score based on the update information, and
  perform a security action in response to the updated second threat score; and a dashboard device to:
  receive selection input selecting a first user interface element representing the first threat score;
  determine trend information about the first threat score based on a non-updated version of the first threat score and the update information; and
  cause presentation of at least two of the calculated threat scores for the first subset of threat entities, a context respectively associated with the at least two calculated threat scores of the first subset of threat entities, and the trend information.

3. The system of claim 2, wherein the dashboard device is part of the at least one other threat management device.

4. A method for providing a hierarchical threat intelligence, comprising:
  receiving, by a system comprising a processor, a plurality of calculated threat scores from a plurality of threat management devices that are part of a network system comprising a network, wherein the threat scores are for respective threat entities that are part of the network system and are respectively associated with context information, the context information for a first threat score of the threat scores including information about a first subset of threat entities on which the first threat score is based, the first threat score calculated for a first threat entity that is at a higher level in a hierarchy of threat entities than the threat entities in the first subset of threat entities;
  determining, by the system, a second threat score for a second threat entity based on threat scores calculated for a second subset of threat entities, the second subset of threat entities including the first threat entity, and the second threat entity being at a higher level in the hierarchy of threat entities than the threat entities of the second subset of threat entities;
  subscribing with a listener of the threat management devices for updated scores calculated for the threat entities of the second subset of threat entities,
  receiving, by the system in response to the subscribing, update information of the first threat score calculated for the first threat entity from the listener;
  updating, by the system, the second threat score based on the update information;
  performing, by the system, a countermeasure that addresses a threat in the network system in response to the updated second threat score, the countermeasure comprising disabling the second threat entity;
  receiving, by the system, selection input selecting a first user interface element representing the first threat score;
  determining, by the system, trend information about the first threat score based on a non-updated version of the first threat score and the update information; and
  causing, by the system, presentation of at least two of the calculated threat scores for the first subset of threat entities, a context respectively associated with the at least two calculated threat scores of the first subset of threat entities, and the trend information.

5. The method of claim 4, further comprising:
  causing presentation of at least one interactive user interface element representing the second threat score; and
  causing presentation of the threat scores for the second subset of entities in response to an interaction with the interactive user interface element.

6. The non-transitory machine-readable storage medium of claim 1, further comprising instructions that when executed cause the device to:
  cause display of a second user interface element representing the second threat score; and
  in response to user selection of the second user interface element, cause display of the threat scores and context information of the threat entities of the second subset of threat entities.

7. The non-transitory machine-readable storage medium of claim 1, further comprising instructions that when executed cause the device to:
  receive selection of a third user interface element corresponding to a formula to apply for calculating the second threat score; and
  in response to the received selection of the third user interface element, apply the formula to calculate the second threat score.

8. The system of claim 2, wherein the at least one threat management device is to:
  receive selection of a third user interface element corresponding to a formula to apply for calculating the second threat score; and
  in response to the received selection of the third user interface element, apply the formula to calculate the second threat score.

9. The method of claim 4, further comprising:
  receiving selection of a second user interface element corresponding to a formula to apply for calculating the second threat score; and
  in response to the received selection of the second user interface element, applying the formula to calculate the second threat score.

10. The non-transitory machine-readable storage medium of claim 1, wherein in the hierarchy of threat entities, a threat entity at a first hierarchical level in the hierarchy includes threat entities at a second, lower hierarchical level in the hierarchy, and a threat entity at the second hierarchical level in the hierarchy includes threat entities at a third hierarchical level in the hierarchy, the third hierarchical level lower than the second hierarchical level, wherein the second subset of threat entities includes the threat entities of the second hierarchical level, and the first subset of threat entities includes the threat entities of the third hierarchical level, and wherein interrelationships of the threat entities of the hierarchy of threat entities allow for propagation of a change in the first threat score calculated for the first threat entity to the second threat score calculated for the second threat entity.

* * * * *